(12) United States Patent
Hsieh

(10) Patent No.: US 10,624,281 B2
(45) Date of Patent: Apr. 21, 2020

(54) DRIP IRRIGATION DEVICE FOR FLOWER POT

(71) Applicant: Chin-San Hsieh, Tainan (TW)

(72) Inventor: Chin-San Hsieh, Tainan (TW)

( * ) Notice: Subject to any disclaimer, the term of this patent is extended or adjusted under 35 U.S.C. 154(b) by 57 days.

(21) Appl. No.: 16/136,256

(22) Filed: Sep. 20, 2018

(65) Prior Publication Data

US 2019/0014729 A1  Jan. 17, 2019

(51) Int. Cl.
*A01G 27/00* (2006.01)
*A01G 13/02* (2006.01)
*A01G 25/02* (2006.01)

(52) U.S. Cl.
CPC ......... *A01G 27/00* (2013.01); *A01G 13/0281* (2013.01); *A01G 25/02* (2013.01); *A01G 27/008* (2013.01)

(58) Field of Classification Search
CPC .. A01G 13/0281; A01G 25/02; A01G 25/023; A01G 27/00; A01G 27/005; A01G 27/006; A01G 27/008; A01G 27/06
USPC ........................................ 47/48.5, 64, 79, 80
See application file for complete search history.

(56) References Cited

U.S. PATENT DOCUMENTS

| | | | | |
|---|---|---|---|---|
| 1,029,107 A * | 6/1912 | Couls | ...................... | E02B 13/00 405/39 |
| 2,782,561 A * | 2/1957 | Smith | ................ | A01G 13/0237 47/21.1 |
| 5,675,929 A * | 10/1997 | Sontea | ................... | A01G 31/00 47/18 |
| 5,852,895 A * | 12/1998 | Sinanan | ................. | A01G 9/022 47/33 |
| 6,601,339 B1 * | 8/2003 | Parker | ................ | A01G 13/0281 47/48.5 |
| 2006/0064929 A1 * | 3/2006 | Allen | ..................... | A01G 29/00 47/48.5 |
| 2013/0298463 A1 * | 11/2013 | Ke | ......................... | A01G 9/033 47/79 |
| 2017/0188525 A1 * | 7/2017 | Paige, Sr. | .......... | A01G 13/0243 |

FOREIGN PATENT DOCUMENTS

DE   20 2018 106 255   * 2/2018   ............. A01G 27/02

* cited by examiner

*Primary Examiner* — William V Gilbert (57) ABSTRACT

A drip irrigation device for a flower pot is provided with a main member including a central aperture, porous top and bottom layers around the central aperture, an intermediate layer around the central aperture and sandwiched between the top and bottom layers, and a slit extending from the central aperture to an edge of the main member and cutting through the intermediate layer and the top and bottom layers; and a base including at least one curved member, a central hole, a plurality of first compartments in an outer portion of each curved member, a plurality of holes through a bottom of each first compartment, a second compartment in an inner portion of each curved member, a drip hole through a bottom of each second compartment, and a plurality of spaced legs extending downward from a bottom of the base.

6 Claims, 8 Drawing Sheets

FIG.8 ing wall 27, a plurality of holes 1231 through a bottom of

DRIP IRRIGATION DEVICE FOR FLOWER POT

BACKGROUND OF THE INVENTION

1. Field of the Invention

The invention relates to flower pot and more particularly to a drip irrigation device for a flower pot having improved characteristics.

2. Description of Related Art

Floriculture is a discipline of horticulture concerned with the cultivation of flowering and ornamental plants for gardens and for floristry, comprising the floral industry. The development of new varieties is a major occupation of floriculturists.

Drip irrigation is a type of micro-irrigation system that has the potential to save water and nutrients by allowing water to drip slowly to the roots of plants. The goal is to place water directly into the root zone and minimize evaporation. Drip irrigation systems distribute water through a network of valves, pipes, tubing and emitters. Depending on how well designed, installed, maintained, and operated it is, a drip irrigation system can be more efficient than other types of irrigation systems such as sprinkler irrigation.

However, however conventional drip irrigation devices or systems for flower pots have many drawbacks including either too water or too litter water being applied to the plants, water being difficult of being retained, and nutrients of the soil being washed away by water.

Thus, the need for improvement still exists.

SUMMARY OF THE INVENTION

It is therefore one object of the invention to provide a drip irrigation device for a flower pot, comprising a main member including a central aperture, porous top and bottom layers around the central aperture, an intermediate layer around the central aperture and sandwiched between the top and bottom layers, and a slit extending from the central aperture to an edge of the main member and cutting through the intermediate layer and the top and bottom layers; and a base including at least one curved member, a central hole, a plurality of first compartments in an outer portion of each of the at least one curved member, a plurality of holes through a bottom of each first compartment, a second compartment in an inner portion of each of the at least one curved member, a drip hole through a bottom of each second compartment, and a plurality of spaced legs extending downward from a bottom of the base.

The above and other objects, features and advantages of the invention will become apparent from the following detailed description taken with the accompanying drawings.

DETAILED DESCRIPTION OF THE INVENTION

Referring to FIGS. 1 to 5 and 8, a drip irrigation device 1 mounted on a flower pot 4 in accordance with a first preferred embodiment of the invention comprises a main member 11 and a base 12 which can be unitary or assembled from various parts. The main member 11 and a base 12 are discussed in detail below.

Figure 1:
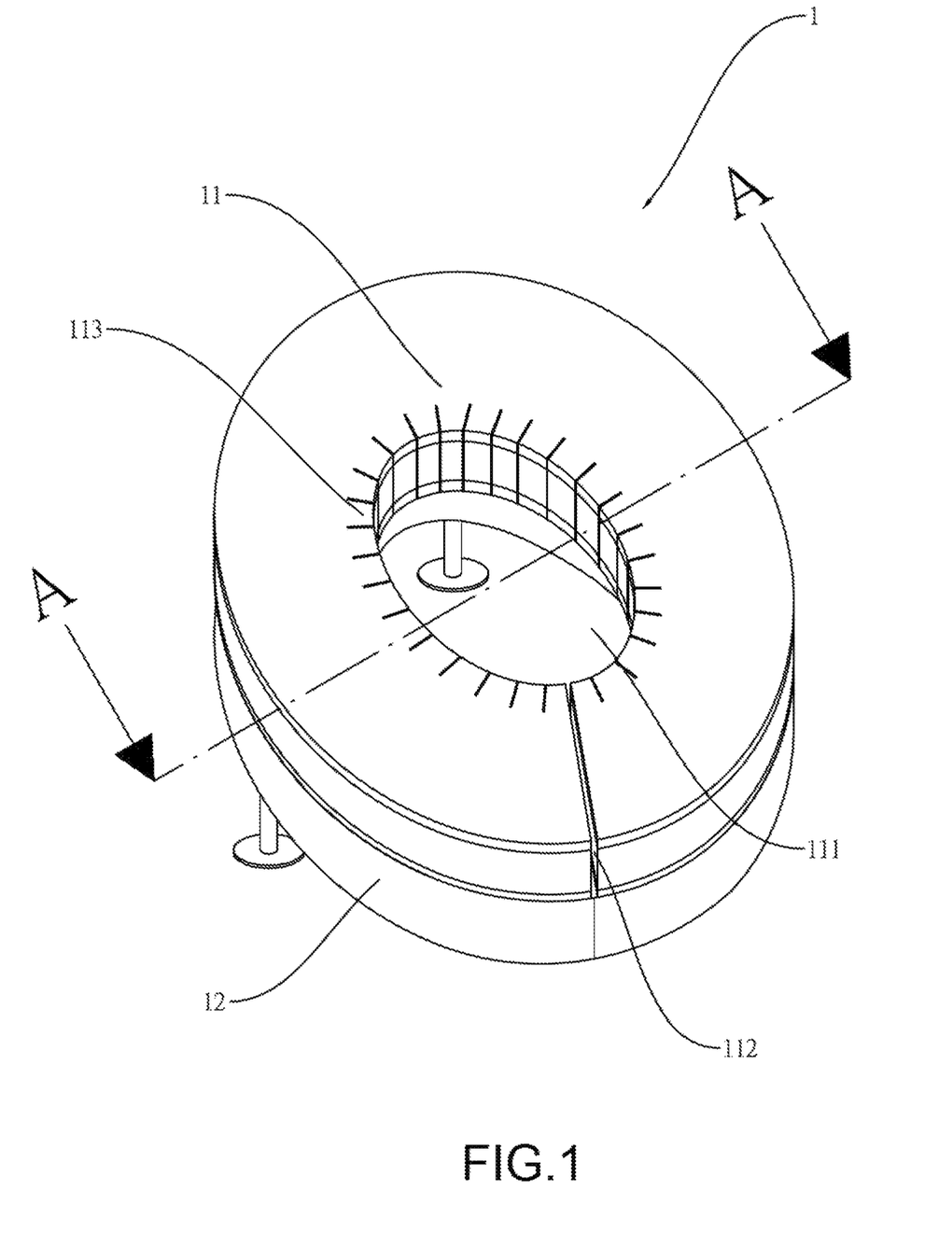
FIG. 1 is a perspective view of a drip irrigation device for a flower pot according to a first preferred embodiment of the invention.
Figure 2:
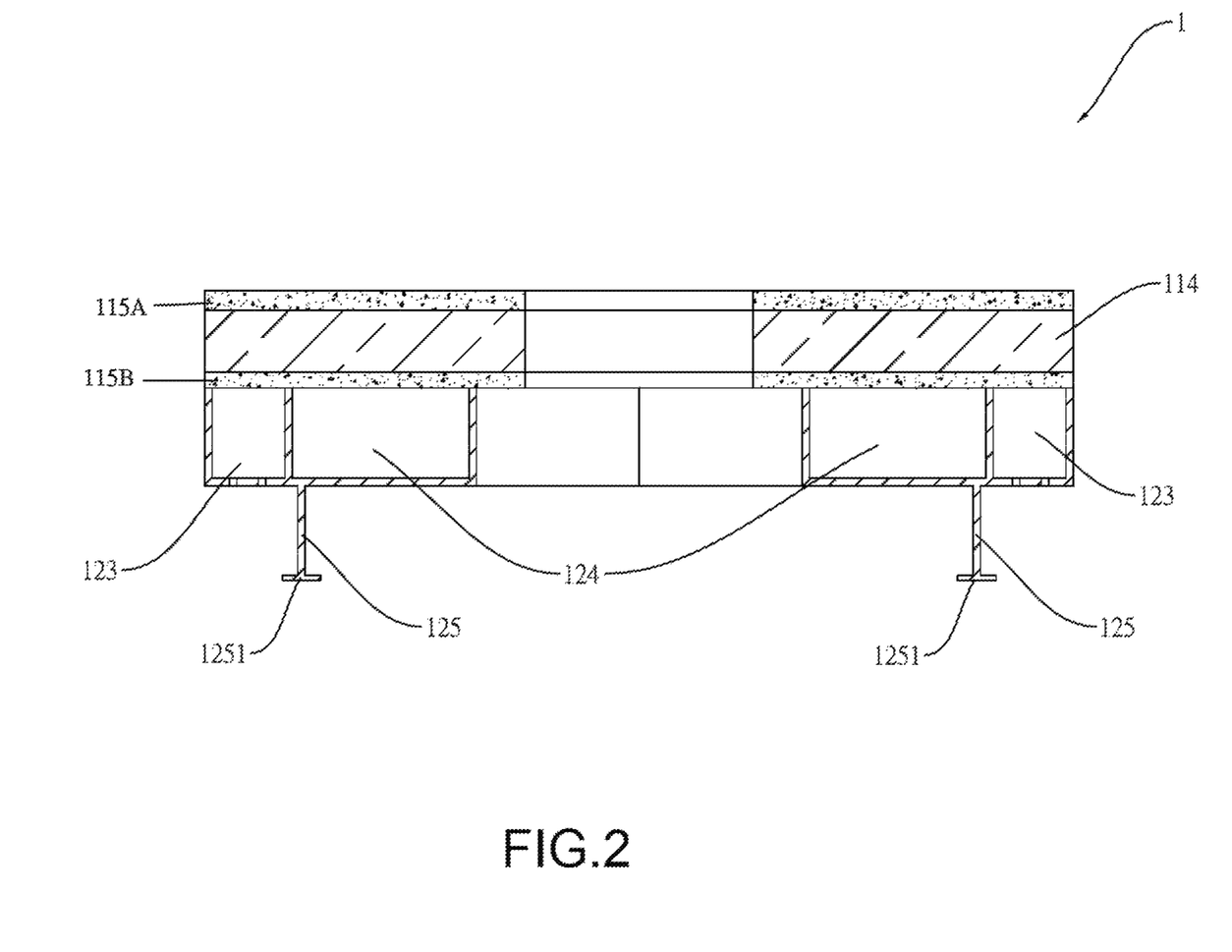
FIG. 2 is a sectional view along line A-A of FIG. 1.
Figure 3:
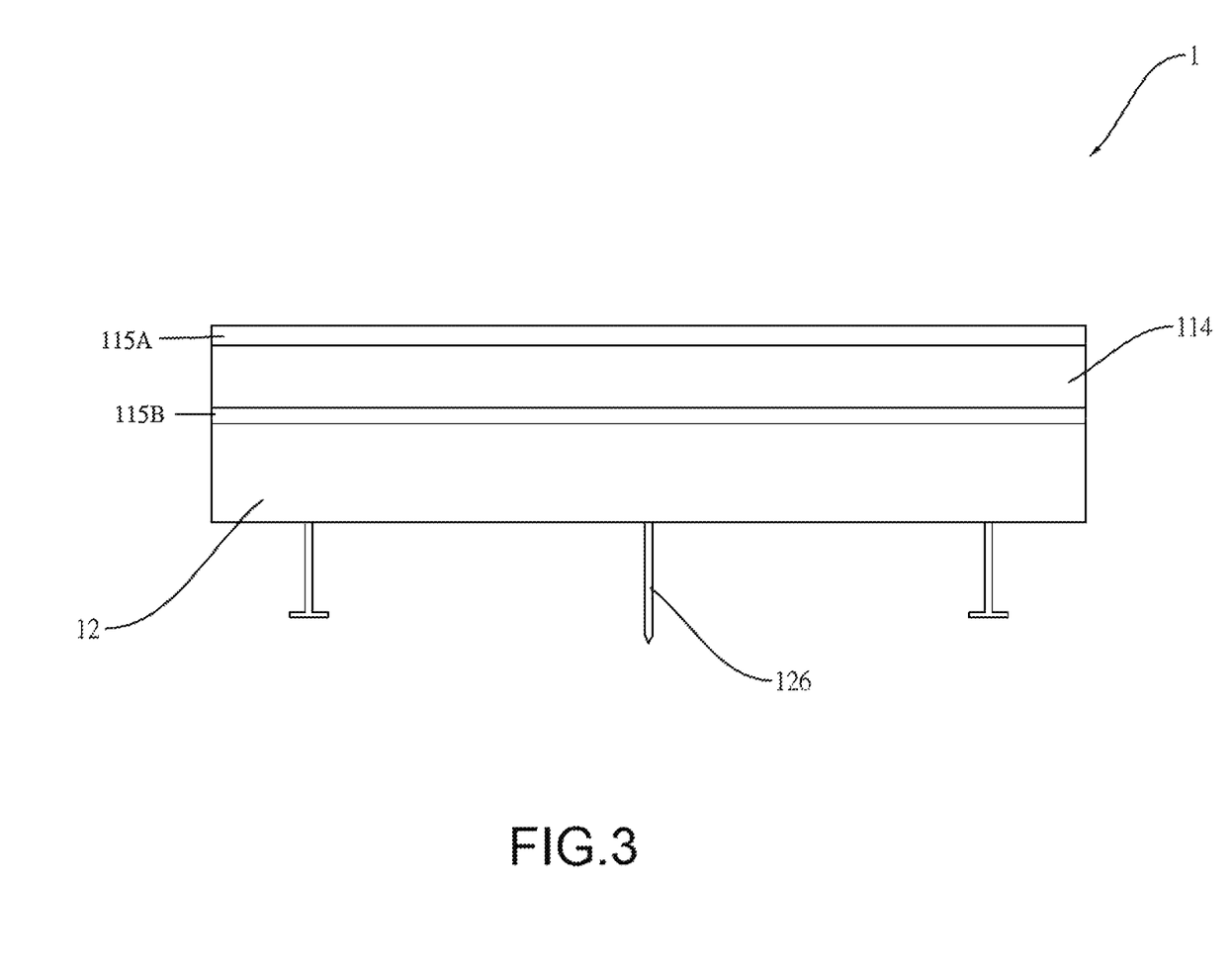
FIG. 3 is a side elevation of FIG. 1.

The round main member 11 includes a central hole 111 for allowing a plant 2 to grow through it, ring shaped top and bottom layers 115A and 115B around the central hole 111, a ring shaped intermediate layer 114 around the central hole 111 and sandwiched between the top and bottom layers 115A and 115B, a slit 112 extending from the central hole 111 to an edge of the main member 11 and cutting through the intermediate layer 114 and the top and bottom layers 115A and 115B, the slit 112 being adapted to allow the stem of the plant 2 to pass through after two sides thereof being further pulled away from each other, and a plurality of equally spaced gaps 113 around an inner wall of the central hole 111 and partially cutting through the intermediate layer 114 and the top and bottom layers 115A and 115B. The top and bottom layers 115A and 115B are porous and the intermediate layer 114 is formed of resin-like cotton, foam-like cotton, rock-like cotton, or the like. Preferably, the intermediate layer 114 is dark for absorbing sunlight and the top and bottom layers 115A and 115B have one of a plurality of different colors.

Figure 4:
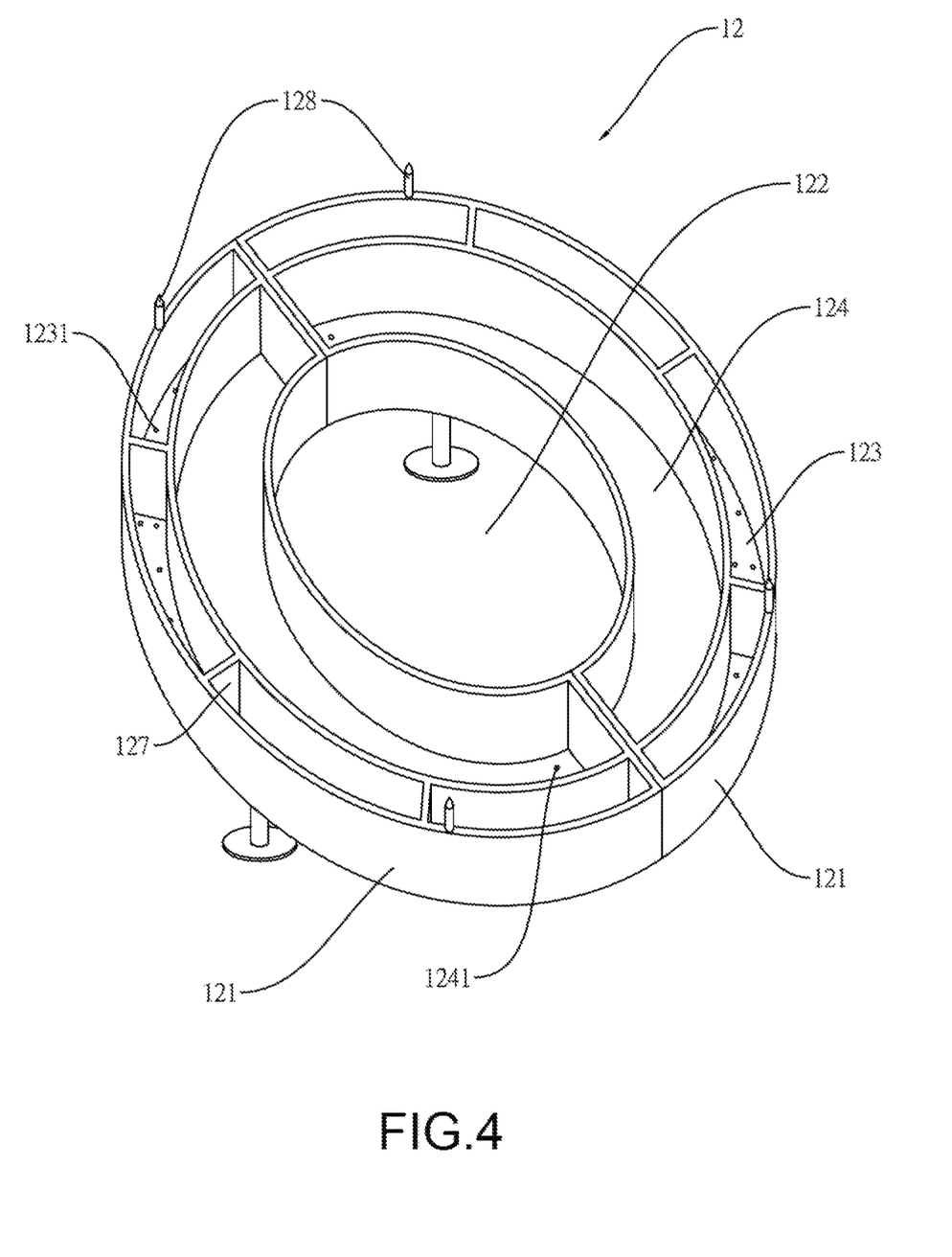
FIG. 4 is a perspective view of the base of the drip irrigation device.
Figure 5:
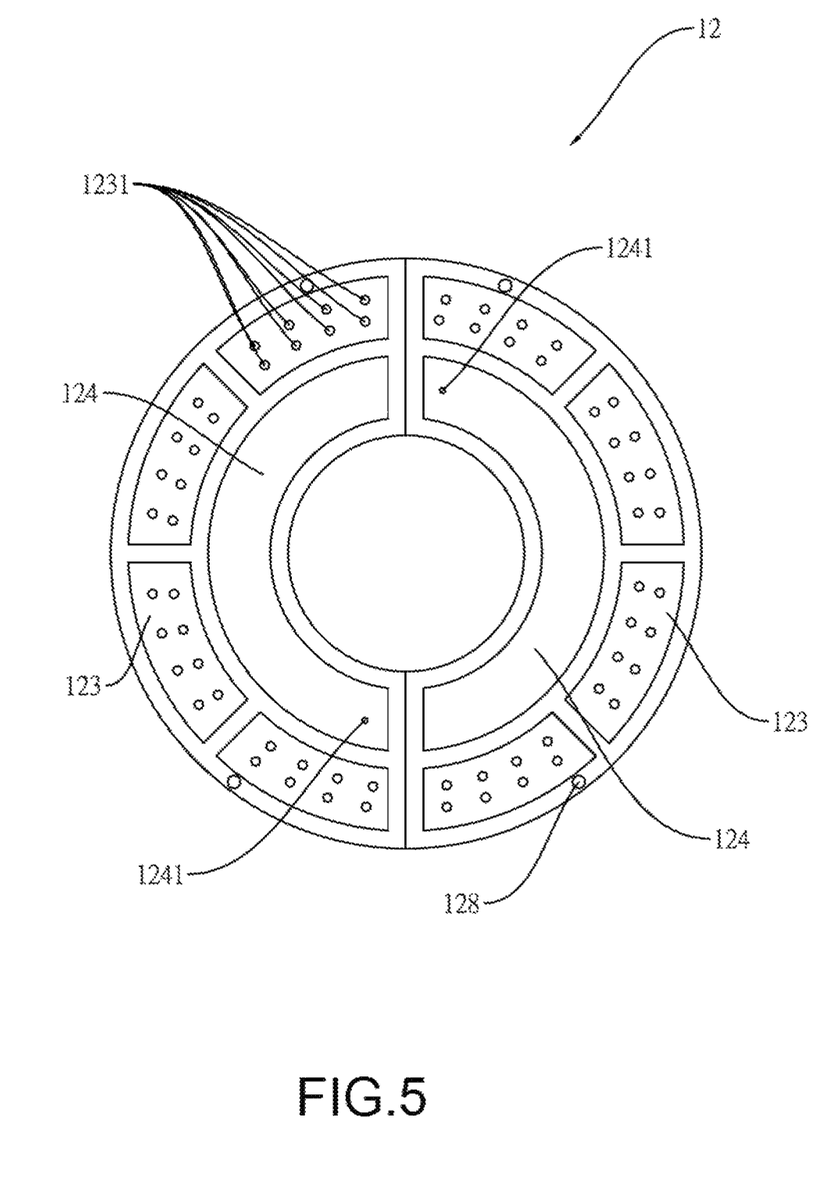
FIG. 5 is a top view of FIG. 4.

The round base 12 includes two curved members 121 together forming the main portion of the base 12, a central hole 122 for allowing the plant 2 to grow through it, a plurality of first compartments 123 in an outer portion of each curved member 121 for storing fertilizer 3, any two adjacent first compartments 123 being separated by a dividing wall 27, a plurality of holes 1231 through a bottom of each first compartment 123, a second compartment 124 in an inner portion of each curved member 121 for storing water, a drip hole 1241 through a bottom of each second compartment 124, a plurality of equally spaced legs 125 extending downward from a bottom of the base 12, the leg 125 having a flat, enlarged lower end 1251 for anchoring purposes, a plurality of pegs 126 extending downward from the bottom of the base 12 for anchoring purposes, and a plurality of pins 128 equally spaced around top edges of the curved members 121 for securing to the main member 11.

Figure 8:
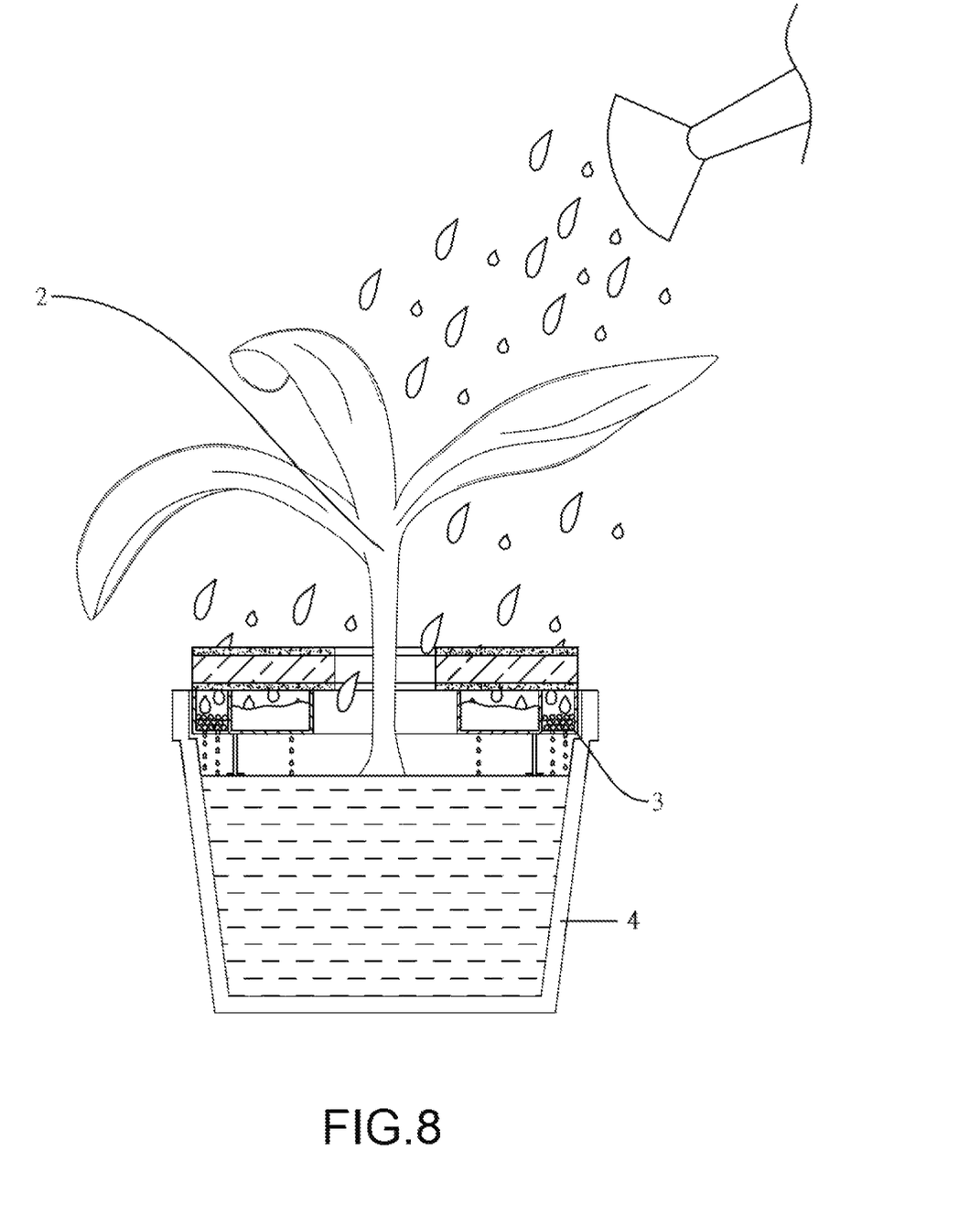
FIG. 8 is a side elevation in part section of a flower pot incorporating the drip irrigation device of either embodiment.

As shown in FIG. 8 specifically, the main member 11 is disposed above a top edge of the flower pot 4, the pins 128 are inserted into the bottom layer 115B for fastening the base 12 and the main member 11 together, and the base 12 is disposed in the flower pot 4. The plant 2 grows from soil in the flower pot 4 through the central holes 122, 111. Water is sprinkled from a watering pot over the plant 2 and in turn the water drips slowly through the top layer 115A, the intermediate layer 114 and the bottom layer 115B into the first and second compartments 123, 124 for temporary storage. Finally, the water flows through the holes 1231 and the drip holes 1241 into a lower portion of the flower pot 4.

Figure 6:
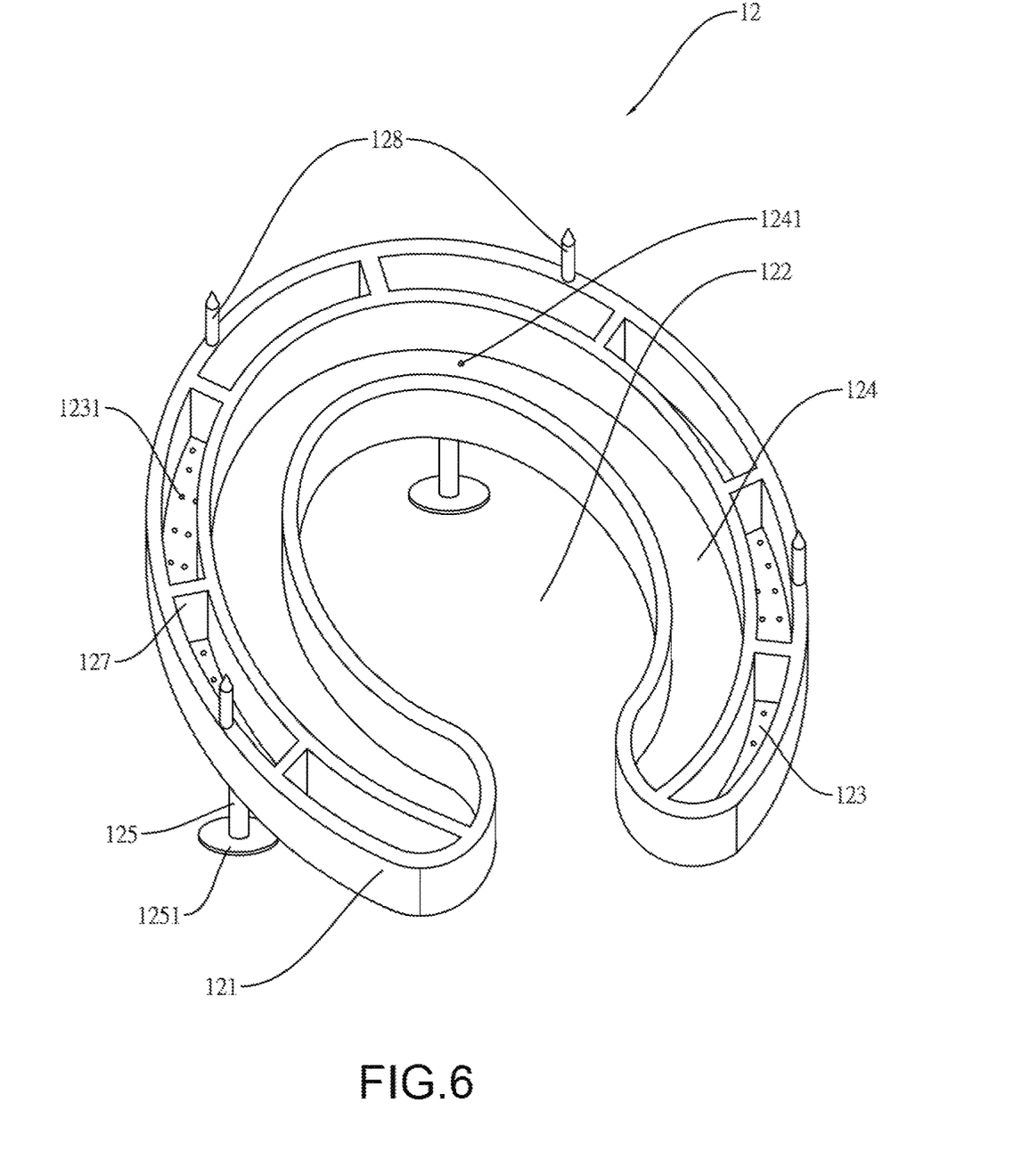
FIG. 6 is a perspective view of a base of a drip irrigation device for a flower pot according to a second preferred embodiment of the invention.
Figure 7:
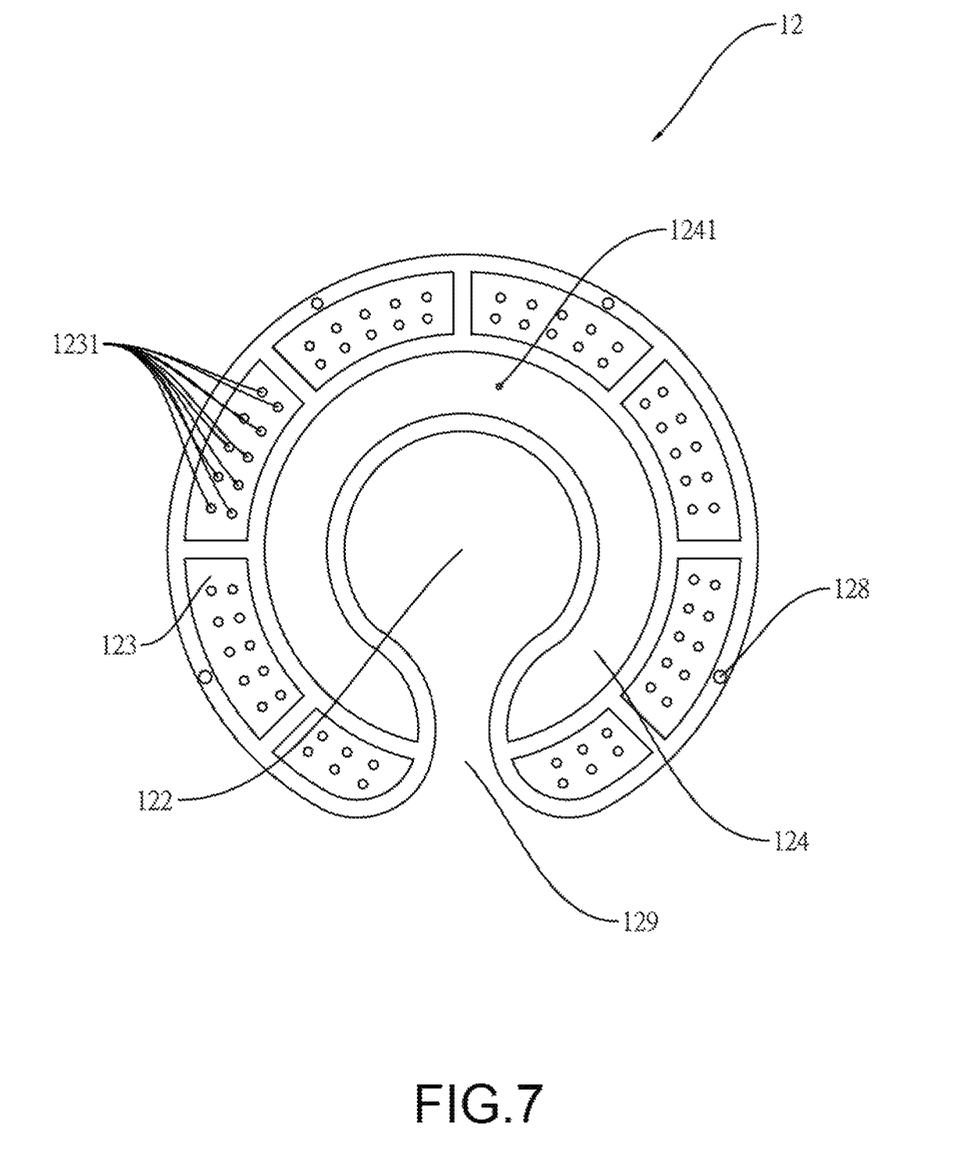
FIG. 7 is a top view of FIG. 6.

Referring to FIGS. 6 to 8, a drip irrigation device mounted on a flower pot 4 in accordance with a second preferred embodiment of the invention is shown. The characteristics of the second preferred embodiment are described below. The base 12 is curved and unitary. An opening 129 is formed through an edge of the base 12 and adapted to allow the stem of the plant 2 to pass through. A central hole 122 is formed through the base 12 for allowing the plant 2 to grow through it. A plurality of first compartments 123 are formed in an outer portion of the base 12 for storing fertilizer 3. A dividing wall 127 is formed between any two adjacent first compartments 123. A plurality of holes 1231 are through a bottom of each first compartment 123. A second compartment 124 is disposed in an inner portion of the base 12 for storing water. A drip hole 1241 is through a bottom of the second compartment 124. A plurality of equally spaced legs 125 extend downward from a bottom of the base 12, the leg 125 having a flat, enlarged lower end 1251 for anchoring purposes. A plurality of pins 128 are spaced around a top edge of the base 121 for securing to the main member 11.

As shown in FIG. 8 specifically, a drip irrigation operation of the second preferred embodiment is the same as that of the first preferred embodiment. Thus, a detailed description thereof is omitted for the sake of brevity.

While the invention has been described in terms of preferred embodiments, those skilled in the art will recognize that the invention can be practiced with modifications within the spirit and scope of the appended claims.

What is claimed is:

1. A drip irrigation device for a flower pot, comprising:
   a main member including a central aperture, top and bottom layers around the central aperture, an intermediate layer around the central aperture and sandwiched between the top and bottom layers, and a slit extending from the central aperture to an edge of the main member and cutting through the intermediate layer and the top and bottom layers wherein the top and bottom layers are porous; and
   a base including at least one curved member, a central hole, a plurality of first compartments in an outer portion of each of the at least one curved member, a plurality of holes through a bottom of each of the first compartments, a second compartment in an inner portion of each of the at least one curved member, a drip hole through a bottom of each second compartment, and a plurality of spaced legs extending downward from a bottom of the base.

2. The drip irrigation device of claim 1, further comprising a plurality of spaced gaps around an inner wall of the central hole of the main member and partially cutting through the intermediate layer and the top and bottom layers.

3. The drip irrigation device of claim 1, further comprising an opening through an edge of the base.

4. The drip irrigation device of claim 1, further comprising a plurality of pegs extending downward from the bottom of the base.

5. The drip irrigation device of claim 1, further comprising a dividing wall disposed between two adjacent first compartments.

6. The drip irrigation device of claim 1, further comprising a plurality of pins spaced around the base.

* * * * *